US006916023B2

(12) United States Patent
Alexander et al.

(10) Patent No.: US 6,916,023 B2
(45) Date of Patent: Jul. 12, 2005

(54) SELF-ADJUSTING CARTRIDGE SEAL

(75) Inventors: Kevin L. Alexander, Brownsburg, IN (US); Jerry McPherson, Jr., Greenfield, IN (US); Michael C. Rodgers, Montpelier, OH (US); Roy Earl Young, II, Indianapolis, IN (US)

(73) Assignee: Illinois Tool Works Inc., Glenview, IL (US)

( * ) Notice: Subject to any disclaimer, the term of this patent is extended or adjusted under 35 U.S.C. 154(b) by 45 days.

(21) Appl. No.: 10/435,790

(22) Filed: May 12, 2003

(65) Prior Publication Data

US 2004/0041349 A1 Mar. 4, 2004

Related U.S. Application Data

(60) Provisional application No. 60/407,317, filed on Aug. 30, 2002.

(51) Int. Cl.[7] .............................. F16J 15/18; B05B 5/00

(52) U.S. Cl. ........................................ 277/518; 239/690

(58) Field of Search .................................. 277/520, 521, 277/910, 510, 518; 239/3, DIG. 4, 690; 222/549

(56) References Cited

U.S. PATENT DOCUMENTS 2,690,360 A * 9/1954 Young ......................... 384/152
3,169,882 A * 2/1965 Kock et al. .................. 427/475
3,194,502 A * 7/1965 West ........................... 239/411
4,796,895 A 1/1989 Perkins
4,824,026 A * 4/1989 Tamura et al. .............. 239/707
4,911,406 A * 3/1990 Attwood ...................... 251/148
4,958,769 A 9/1990 Schowiak
5,203,374 A * 4/1993 Smith, III .............. 137/614.04
5,267,533 A 12/1993 Smith
5,340,228 A 8/1994 Wilcox et al.
5,392,992 A 2/1995 Farnsteiner et al.
5,983,934 A * 11/1999 Smith, III .............. 137/614.04
6,003,792 A * 12/1999 Munezane et al. ........ 239/585.3
6,062,570 A * 5/2000 Erickson ...................... 277/529

FOREIGN PATENT DOCUMENTS

| | | |
|---|---|---|
| DE | 91 07 659.5 | 8/1991 |
| EP | 0 437 112 | 7/1991 |
| EP | 0 447 683 | 9/1991 |
| WO | 94 21501 | 9/1994 |

* cited by examiner

*Primary Examiner*—Alison K. Pickard
(74) *Attorney, Agent, or Firm*—Lisa M. Soltis; Mark W. Croll; Richard D. Conard

(57) ABSTRACT

A seal includes a first seal retainer, a seal holder and a second seal retainer. A somewhat cup-shaped recess of the first seal retainer opens in a first direction of motion of a movable member against which the seal is to seal. The seal holder includes a first somewhat cuplike portion adjacent to the first seal retainer and a second somewhat cuplike portion more remote from the first seal retainer. The first somewhat cuplike portion opens in a second direction of motion opposite the first. The second somewhat cuplike portion opens in the first direction. The second seal retainer includes a first portion closer to the seal holder and a second portion more remote from the seal holder. The second somewhat cuplike portion of the seal holder receives the first portion of the second seal retainer.

22 Claims, 4 Drawing Sheets

SELF-ADJUSTING CARTRIDGE SEAL

CROSS-REFERENCE TO RELATED APPLICATIONS

This is a regular utility patent application of U.S. Ser. No. 60/407,317 filed Aug. 30, 2002 and assigned to the same assignee as this application. The disclosure of U.S. Ser. No. 60/407,317 is hereby incorporated herein by reference.

FIELD OF THE INVENTION

This invention relates to improvements in seals. It is disclosed in the context of a seal around a movable component of a valve, such as, for example, the needle of a needle valve, which controls the flow of a pressurized fluid. However, it is believed to have other applications as well.

BACKGROUND OF THE INVENTION

Automatic and handheld coating material dispensing devices of various types are well-known. There are, for example, the guns illustrated and described in U.S. Pat. Nos. 3,169,882; 4,002,777;and, 4,285,446. There are also the Ransburg model REA 3, REA 4, REA 70, REA 90, REM and M-90 guns, all available from ITW Ransburg, 320 Phillips Avenue, Toledo, Ohio, 43612-1493. The disclosures of these references are hereby incorporated herein by reference. No representation is intended by this listing that a thorough search of all material prior art has been conducted, or that no better art than that listed is available, or that the listed items are material to patentability. Nor should any such representation be inferred.

Many currently available atomizers include needle valves. The movable components of such valves extend through portions of the atomizer through which the material being atomized, typically a liquid under relatively high pressure, flows. Typically, the movable components of such valves pass through compressible chevron packing in a packing gland. Such packings include, for example, a stack of disks, sometimes of bibulous materials. The disks are stacked inside a housing which may have (a) threaded closure(s) at one or both ends. Each disk has a hole through which the needle extends in sealed fashion. The dimensions of the disks are such that, when the stack of disks is inserted into the housing, the disks are collapsed somewhat to fit into the housing. Sections through the housing along the axis of the needle show the disks in somewhat of a chevron shape, giving the packing its name. A threaded closure at an end of the housing is removable from the housing to repair the packing, such as by replacing individual disks or all the disks of the packing. The threaded closure typically can also be adjusted into or onto the housing to increase the compression of the disks within the housing and increase the force with which they seal to the needle which passes through the hole in each disk. Thus, adjustment of the threaded closure is often done when the packing leaks. If the adjustment stops the leak, further, more time-consuming repair may be forestalled and downtime averted.

The terms "front," "rear," "top," "bottom," and the like are used for convenience in explanation and understanding of the invention only, and are not intended to be, nor should they be considered as, used in any limiting sense.

DISCLOSURE OF THE INVENTION

According to one aspect of the invention, a seal includes a first seal retainer, a seal holder and a second seal retainer. A somewhat cup-shaped recess of the first seal retainer opens in a first direction of motion of a movable member against which the seal is to seal. The seal holder includes a first somewhat cuplike portion adjacent to the first seal retainer and a second somewhat cuplike portion more remote from the first seal retainer. The first somewhat cuplike portion opens in a second direction of motion opposite the first. The second somewhat cuplike portion opens in the first direction. The second seal retainer includes a first portion closer to the seal holder and a second portion more remote from the seal holder. The second somewhat cuplike portion of the seal holder receives the first portion of the second seal retainer.

According to another aspect of the invention, a dispensing device for fluid coating material includes an inlet for fluid coating material, an outlet for fluid coating material, and a valve controlling the flow of the fluid coating material between the inlet and the outlet. The valve includes a movable valve member and a valve actuator for moving the movable valve member between a position in which fluid coating material flows between the inlet and the outlet and a position in which fluid coating material does not flow between the inlet and the outlet. The movable valve member extends into the inlet. A seal is provided for sealing the movable valve member where the movable valve member extends into the inlet. The seal includes a seal retainer closer to the inlet and a seal holder more remote from the inlet. The seal holder engages the seal retainer.

According to this aspect of the invention, the apparatus further includes a cartridge having an exterior dimension. The seal retainer and seal holder include main body portions having perimetral dimensions substantially equal to the exterior dimension of the cartridge.

Illustratively according to this aspect of the invention, the dispensing device includes a housing having an end adjacent the inlet including a stop against which the seal retainer is stopped when the seal is inserted into the housing.

Further illustratively according to the invention, the apparatus includes a second seal retainer at an end of the housing for retaining the seal in the housing.

Further illustratively according to the invention, the apparatus includes passageways extending through the seal retainer and the seal holder. The movable valve member extends movably through the passageways.

Illustratively according to this aspect of the invention, the passageways have cross sectional dimensions transverse to the first and second directions. These cross sectional dimensions are substantially the same as cross sectional dimensions of the movable valve member transverse to the first and second directions where the movable valve member passes through the passageways. A first seal is provided between the seal retainer and the seal holder. The first seal is exposed to the passageways and slidably and sealingly receives the movable valve member.

Further illustratively according to this aspect of the invention, the apparatus includes an O-ring seal captured between the seal retainer and the seal holder. The O-ring seal is exposed to the passageways and slidably and sealingly receives the movable valve member.

Illustratively according to this aspect of the invention, the seal holder includes a somewhat cuplike portion. The apparatus further includes an O-ring seal provided in the somewhat cuplike portion. The O-ring seal is exposed to the passageways and slidably and sealingly receives the movable valve member.

Further illustratively according to this aspect of the invention, the apparatus includes an O-ring seal provided between the seal retainer and the seal holder.

Illustratively according to this aspect of the invention, the seal retainer and seal holder are constructed from acetal resins.

Illustratively according to this aspect of the invention, the movable valve member includes an electrode which extends through the valve to the outlet. The apparatus further includes a high-magnitude potential source coupled to the electrode to expose coating material passing through the outlet to electric charge.

According to another aspect of the invention, a dispensing device for fluid coating material includes an inlet for fluid coating material, an outlet for fluid coating material, and a valve controlling the flow of the fluid coating material between the inlet and the outlet. The valve includes a movable valve member and a valve actuator for moving the movable valve member between a position in which fluid coating material flows between the inlet and the outlet and a position in which fluid coating material does not flow between the inlet and the outlet. The movable valve member extends into the inlet. A seal is provided for sealing the movable valve member where the movable valve member extends into the inlet. The seal includes a seal retainer more remote from the inlet and a seal holder closer to the inlet. The seal holder engages the seal retainer.

Illustratively according to this aspect of the invention, the apparatus further includes a cartridge having an exterior dimension. The seal holder and seal retainer include main body portions having perimetral dimensions substantially equal to the exterior dimension of the cartridge.

Illustratively according to this aspect of the invention, the dispensing device includes a housing having an end adjacent the inlet including a stop against which the seal is stopped when the seal is inserted into the housing.

Further illustratively according to this aspect of the invention, the apparatus includes a second seal retainer at an end of the housing for retaining the seal in the housing.

Further illustratively according to this aspect of the invention, the apparatus includes passageways extending through the seal holder and the seal retainer. The movable valve member extends movably through the passageways.

Illustratively according to this aspect of the invention, the passageways have cross sectional dimensions transverse to the first and second directions. These cross sectional dimensions are substantially the same as cross sectional dimensions of the movable valve member where the movable valve member passes through the passageways.

Further illustratively according to this aspect of the invention, the apparatus includes an O-ring seal captured between the seal holder and the seal retainer. The O-ring seal is exposed to the passageways and slidably and sealingly receives the movable valve member.

Illustratively according to this aspect of the invention, the seal holder includes a somewhat cuplike portion. The O-ring seal is provided in the somewhat cuplike portion of the seal holder.

Illustratively according to this aspect of the invention, the seal holder is constructed from acetal resins.

Illustratively according to this aspect of the invention, the seal retainer is constructed from resin with an electrically non-insulative filler.

Illustratively according to this aspect of the invention, the resin with an electrically non-insulative filler comprises carbon fiber filled polyamide-imide Illustratively according to this aspect of the invention, the movable valve member includes an electrode which extends through the valve to the outlet. The apparatus further includes a high-magnitude potential source coupled to the electrode to expose coating material passing through the outlet to electric charge.

BRIEF DESCRIPTION OF THE DRAWINGS

The invention may best be understood by referring to the following description and accompanying drawings which illustrate the invention. In the drawings.

DETAILED DESCRIPTIONS OF ILLUSTRATIVE EMBODIMENTS

Figure 1:
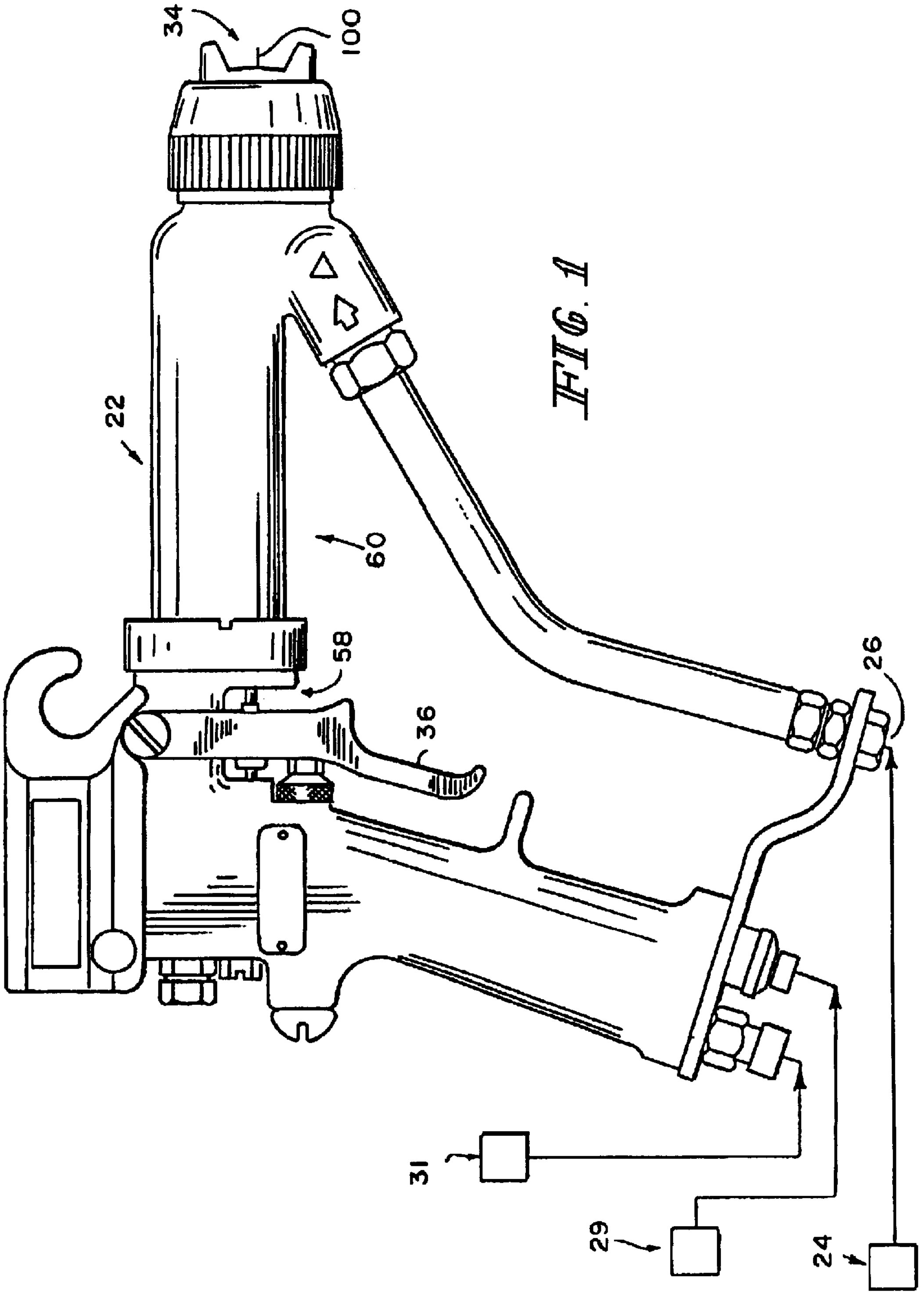
FIG. 1 illustrates a side elevational view of an atomizer of a type which is capable of incorporating the invention, with other components of a system incorporating the atomizer illustrated diagrammatically.
Figure 2:
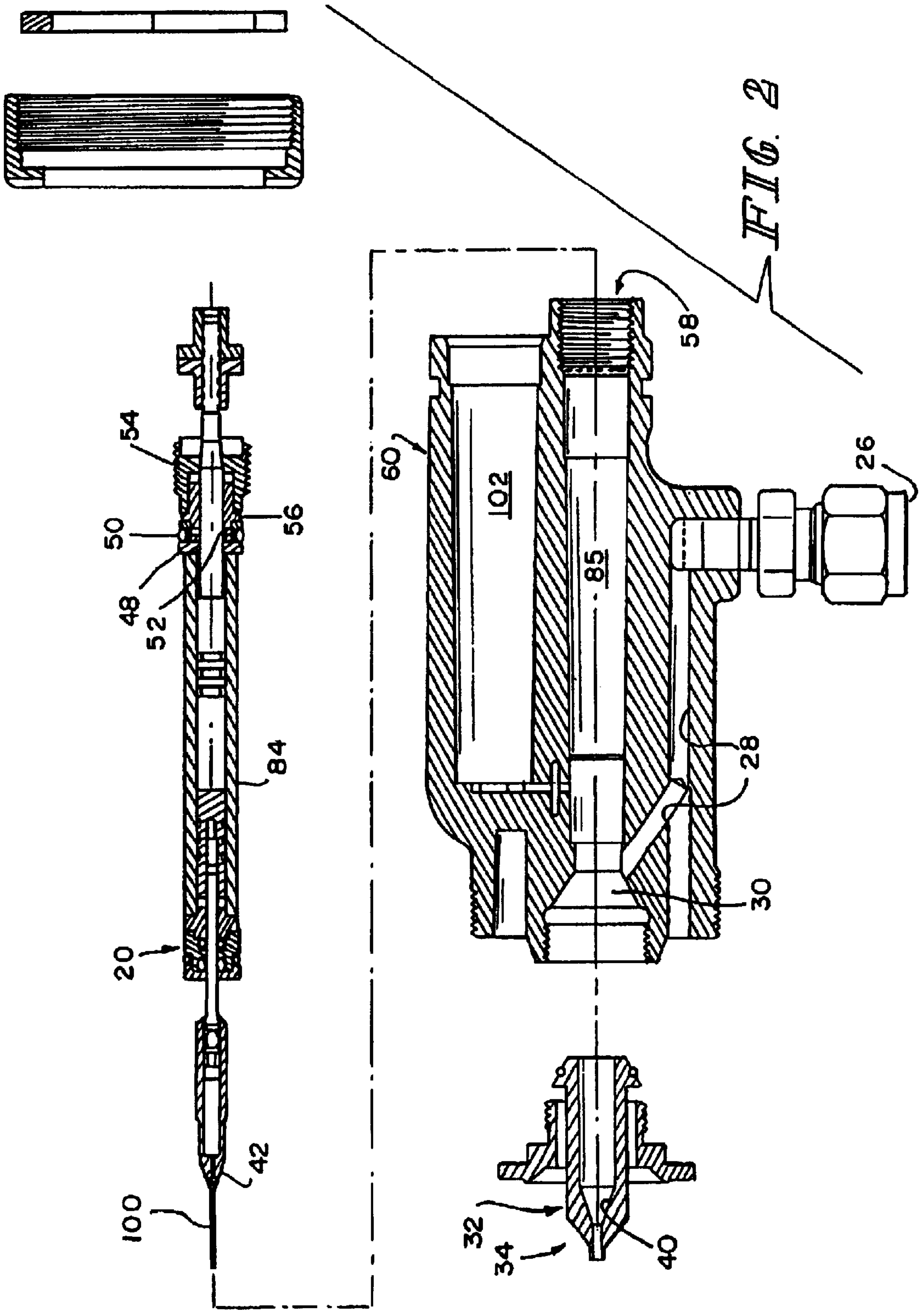
FIG. 2 illustrates an exploded fragmentary longitudinal sectional side elevational view of an atomizer constructed according to the invention.
Figure 3A:
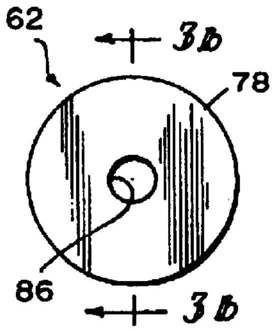
FIGS. 3*a*, 3*b* and 3*c* illustrate a front elevational view, a sectional side elevational view taken generally along section lines 3*b*—3*b* of FIG. 3*a*, and a rear elevational view, respectively, of a detail of FIG. 2.
Figure 3B:
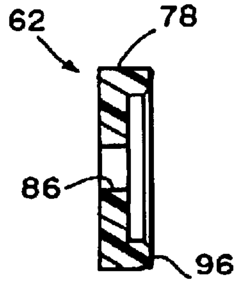
Figure 3C:
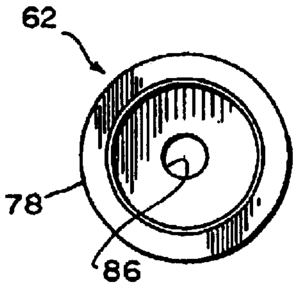
Figure 4C:
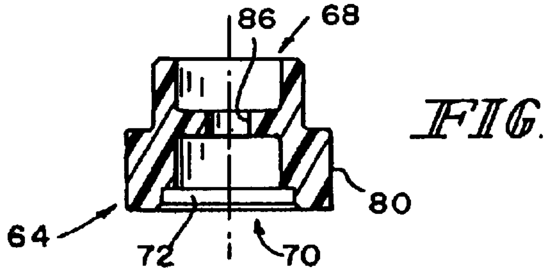
FIGS. 4*a*, 4*b*, 4*c* and 4*d* illustrate a rear elevational view, a sectional side elevational view taken generally along section lines 4*b*—4*b* of FIG. 4*a*, a sectional top plan view taken generally along section lines 4*c*—4*c* of FIG. 4*a*, and a side elevational view, respectively, of a detail of FIG. 2.
Figure 4B:
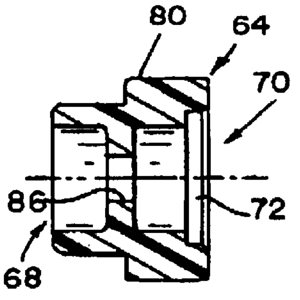
Figure 4A:
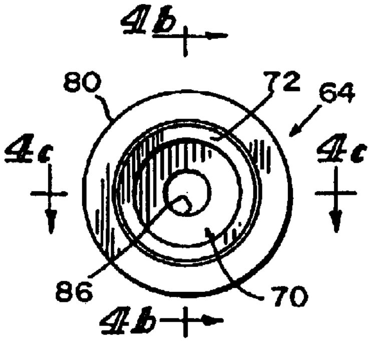
Figure 4D:
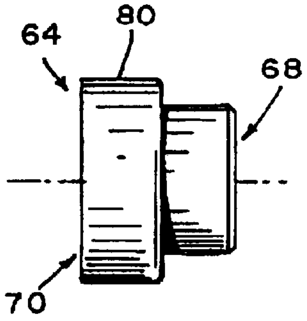
Figure 5A:
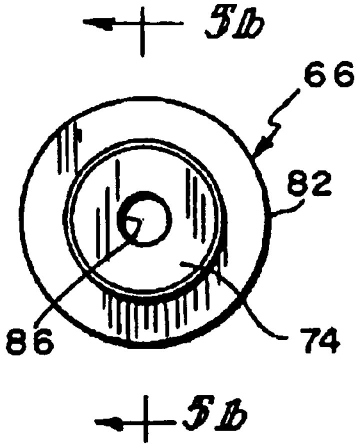
FIGS. 5*a*, 5*b* and 5*c* illustrate a front elevational view, a sectional side elevational view taken generally along section lines 5*b*—5*b* of FIG. 5*a*, and a rear elevational view, respectively, of a detail of FIG. 2; and, FIG. 6 illustrates a sectional side elevational view of an assembly including the details illustrated in FIGS. 3*a–c*, 4*a–d* and 5*a–c*.
Figure 5B:
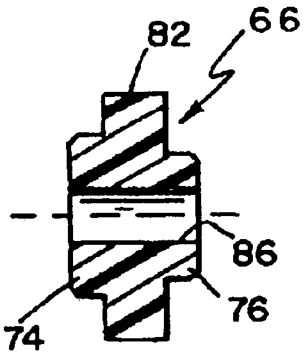
Figure 5C:
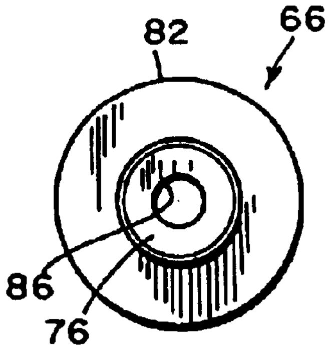
Figure 6:
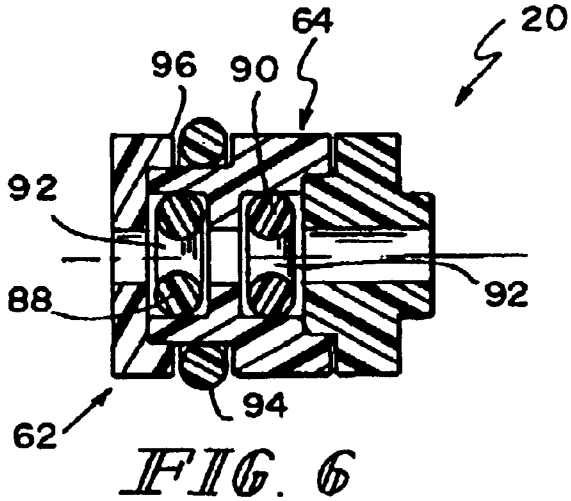

The valve seal of the present invention is intended to permit sealing of movable valve components, for example, valve needles, against the leakage of liquids, for example, coating materials maintained at relatively high pressure, and the like. Referring to FIGS. 1–2, in a typical implementation, the valve seat 20 is provided in a dispensing device (hereinafter sometimes "gun") 22. Gun 22 illustratively is of the general type of the Ransburg model REA 3, REA 4, REA 70, REA 90, REM and M-90 guns, available from ITW Ransburg, 320 Phillips Avenue, Toledo, Ohio, 43612-1493. The liquid is supplied from a source 24 to an input port 26 of the gun 22, and is supplied through a passageway 28 (FIG. 2) in the gun 22 to a gallery 30 upstream from a valve 32 in the flow path of the liquid being dispensed. Other services which the gun 22 may require to operate include, for example, relatively high-magnitude electrostatic potential, relatively lower-magnitude AC potential, relatively lower-magnitude DC potential, relatively higher pressure compressed air and relatively lower pressure compressed air from one or more sources. Two such sources 29 and 31 are illustrated.

The liquid is dispensed from the gallery 30 under the control of the valve 32 to the nozzle 34 of the gun 22, where the liquid is atomized and dispensed. For example, a trigger 36 (FIG. 1) held by a gun 22 operator, controls the position of the valve 32. Valve 32 includes a seat 40 and a movable valve member 42. The position of the movable valve member 42 is controlled by the position of the trigger 36. The movable valve member 42 extends through a self-adjusting cartridge seal assembly 20 according to the invention, a rear needle seal retainer 48, an O-ring 50, a spring-loaded U-cup lip seal 52, a seal packing nut 54, and a seal spacer 56 to the rear 58 of the gun 22 barrel 60.

Turning now to FIGS. 3*a–c*, 4*a–d*, 5*a–c* and 6, the illustrated self-adjusting cartridge seal assembly 20 includes a front seal retainer 62, a seal holder 64 and a rear seal retainer 66. Front seal retainer 62 is shallow cup-shaped, with the cup opening toward the rear of gun 22. Seal holder 64 includes a somewhat smaller perimeter, forwardly opening cuplike forward portion 68, and a somewhat larger perimeter, rearwardly opening cuplike rearward portion 70. The internal dimensions of the portions 68, 70 are about the same. However, the internal dimension of rearward portion 70 includes a somewhat larger dimension groove 72 to receive a forward portion 74 of rear seal retainer 66. Rear seal retainer 66 further includes a somewhat smaller perimeter rearwardly extending portion 76. The main body portions 78, 80, 82 of front seal retainer 62, seal holder 64 and rear seal retainer 66 are all of substantially equal dimensions, and those dimensions are substantially the exterior dimensions of the cartridge, or packing tube, 84 (FIG. 2) which along with cartridge seal assembly 20, rear needle seal retainer 48, O-ring 50, U-cup lip seal 52, packing nut 54, and seal spacer 56 are inserted into a passageway 85 provided therefor in barrel 60.

Coaxial passageways 86 extend through all of front seal retainer 62, seal holder 64 and rear seal retainer 66. Passageways 86 all have substantially the dimensions of movable valve member 42 where movable valve member 42 passes through them. O-ring seals 88, 90 (FIG. 6) are held in place in the cuplike interiors of portions 68, 70 of seal holder 64 by front seal retainer 62 and rear seal retainer 66. The interiors 92 of O-ring seals 88, 90 are smaller than the dimensions of movable valve member 42 where it passes through them, so that O-ring seals 88, 90 slidably seal against movable valve member 42. Additionally, an O-ring seal 94 is provided in the space between the rearwardly extending lip 96 of front seal retainer 62 and the main body portion 80 of seal holder 64.

Illustratively, front seal retainer 62 and seal holder 64 are constructed from 150 E natural Delrin brand acetal resin and rear seal retainer 66 is constructed from 30% carbon fiber filled Torlon brand polyamide-imide 7130. The carbon fiber filler renders rear seal retainer 66 electrically more non-insulative to assist in making electrical contact between an electrostatic charging needle 100 at the front of movable valve member 42 and a high-magnitude voltage cascade (not shown) mounted in a cavity 102 provided therefor in barrel 60. Illustratively a low magnitude potential is supplied to the cascade from source 29. O-rings 88, 90, 94 illustratively are constructed from Kalrez brand resins, DuPont part number 2-004-4079.

What is claimed is:

1. A dispensing device for fluid coating material, the dispensing device including an inlet for fluid coating material, an outlet for fluid coating material, and a valve controlling the flow of the fluid coating material between the inlet and the outlet, the valve including a movable valve member and a valve actuator for moving the movable valve member between a position in which fluid coating material flows between the inlet and the outlet and a position in which fluid coating material does not flow between the inlet and the outlet, the movable valve member extending into the inlet, a seal for sealing the movable valve member where the movable valve member extends into the inlet, the seal including a seal retainer closer to the inlet and a seal holder more remote from the inlet, the seal holder engaging the seal retainer, and a cartridge having an exterior dimension, the seal retainer and seal holder including main body portions having perimetral dimensions substantially equal to the exterior dimension of the cartridge.

2. The apparatus of claim 1 wherein the dispensing device includes a housing having an end adjacent the inlet including a stop against which the seal retainer is stopped when the seal is inserted into the housing.

3. The apparatus of claim 2 further including a second seal retainer at an end of the housing for retaining the seal in the housing.

4. The apparatus of claim 1 further including passageways extending through the seal retainer and the seal holder, the movable valve member extending movably through the passageways.

5. The apparatus of claim 4 wherein the passageways have cross sectional dimensions transverse to the first and second directions, which cross sectional dimensions are substantially the same as cross sectional dimensions of the movable valve member transverse to the first and second directions where the movable valve member passes through the passageways, a first seal between the seal retainer and the seal holder, the first seal exposed to the passageways and slidably and sealingly receiving the movable valve member.

6. The apparatus of claim 5 further including an O-ring seal captured between the seal retainer and the seal holder, the O-ring seal exposed to the passageways and slidably and sealingly receiving the movable valve member.

7. The apparatus of claim 5 wherein the seal holder includes a somewhat cuplike portion, the apparatus further including an O-ring seal provided in the somewhat cuplike portion, the O-ring seal exposed to the passageways and slidably and sealingly receiving the movable valve member.

8. The apparatus of claim 5 further including an O-ring seal provided between the seal retainer and the seal holder.

9. The apparatus of claim 1 wherein the seal retainer and seal holder are constructed from acetal resins.

10. The apparatus of claim 1 wherein the movable valve member includes an electrode which extends through the valve to the outlet, the apparatus further including a high-magnitude potential source coupled to the electrode to expose coating material passing through the outlet to electric charge.

11. A dispensing device for fluid coating material, the dispensing device including an inlet for fluid coating material, an outlet for fluid coating material, and a valve controlling the flow of the fluid coating material between the inlet and the outlet, the valve including a movable valve member and a valve actuator for moving the movable valve member between a position in which fluid coating material flows between the inlet and the outlet and a position in which fluid coating material does not flow between the inlet and the outlet, the movable valve member extending into the inlet, a seal for sealing the movable valve member where the movable valve member extends into the inlet, the seal including a seal retainer more remote from the inlet and a seal holder closer to the inlet, the seal holder engaging the seal retainer, and a cartridge having an exterior dimension, the seal holder and seal retainer including main body portions having perimetral dimensions substantially equal to the exterior dimension of the cartridge.

12. The apparatus of claim 11 wherein the dispensing device includes a housing having an end adjacent the inlet including a stop against which the seal is stopped when the seal is inserted into the housing.

13. The apparatus of claim 12 further including a second seal retainer at an end of the housing for retaining the seal in the housing.

14. The apparatus of claim 11 further including passageways extending through the seal holder and the seal retainer, the movable valve member extending movably through the passageways.

15. The apparatus of claim 14 wherein the passageways have cross sectional dimensions transverse to the first and second directions, which cross sectional dimensions are substantially the same as cross sectional dimensions of the movable valve member where the movable valve member passes through the passageways.

16. The apparatus of claim 15 further including an O-ring seal captured between the seal holder and the seal retainer, the O-ring seal exposed to the passageways and slidably and sealingly receiving the movable valve member.

17. The apparatus of claim 15 wherein the seal holder includes a somewhat cuplike portion, the O-ring seal provided in the somewhat cuplike portion of the seal holder.

18. The apparatus of claim 11 wherein the seal holder is constructed from acetal resins.

19. The apparatus of claim 11 wherein the seal retainer is constructed from resin with an electrically non-insulative filler.

20. The apparatus of claim 19 wherein the resin with an electrically non-insulative filler comprises carbon fiber filled polyamide-imide.

21. The apparatus of claim 19 wherein the movable valve member includes an electrode which extends through the valve to the outlet, the apparatus further including a high-magnitude potential source coupled to the electrode to expose coating material passing through the outlet to electric charge.

22. A seal including a first seal retainer, a somewhat cup-shaped recess of the first seal retainer opening in a first direction of motion of a movable member against which the seal is to seal, a seal holder including a first somewhat cuplike portion received within the somewhat cup-shaped recess of the first seal retainer and a second somewhat cuplike portion more remote from the first seal retainer, the first somewhat cuplike portion opening in a second direction of motion opposite the first, and the second somewhat cuplike portion opening in the first direction, and a second seal retainer including a first portion closer to the seal holder and a second portion more remote from the seal holder, the second somewhat cuplike portion of the seal holder receiving the first portion of the second seal retainer.

* * * * *